US008839090B2

(12) United States Patent
Boss et al.

(10) Patent No.: US 8,839,090 B2
(45) Date of Patent: Sep. 16, 2014

(54) SYSTEM AND METHOD TO CAPTURE AND MANAGE INPUT VALUES FOR AUTOMATIC FORM FILL

(75) Inventors: Gregory Jenson Boss, American Fork, UT (US); Yen-Fu Chen, Austin, TX (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1831 days.

(21) Appl. No.: 10/942,418

(22) Filed: Sep. 16, 2004

(65) Prior Publication Data

US 2006/0059434 A1 Mar. 16, 2006

(51) Int. Cl.
*G06F 17/00* (2006.01)

(52) U.S. Cl.
USPC ........... 715/226; 715/968; 715/221; 715/224; 715/225; 715/223

(58) Field of Classification Search
USPC .......... 715/507, 968, 220, 225, 226; 707/104; 713/186
See application file for complete search history.

(56) References Cited

U.S. PATENT DOCUMENTS

| | | | |
|---|---|---|---|
| 4,763,356 A | 8/1988 | Day, Jr. et al. | |
| 6,084,585 A | 7/2000 | Kraft et al. | |
| 6,088,700 A | 7/2000 | Larsen et al. | |
| 6,141,760 A * | 10/2000 | Abadi et al. | 726/14 |
| 6,182,229 B1 | 1/2001 | Nielsen | |
| 6,247,029 B1 | 6/2001 | Kelley et al. | |
| 6,317,834 B1 * | 11/2001 | Gennaro et al. | 713/186 |
| 6,327,598 B1 | 12/2001 | Kelley et al. | |
| 6,341,290 B1 * | 1/2002 | Lombardo et al. | 707/104.1 |
| 6,532,542 B1 | 3/2003 | Thomlinson et al. | |
| 6,651,217 B1 | 11/2003 | Kennedy et al. | |
| 6,704,906 B1 | 3/2004 | Yankovich et al. | |
| 6,728,712 B1 | 4/2004 | Kelley et al. | |
| 6,928,623 B1 * | 8/2005 | Sibert | 715/783 |
| 7,054,906 B2 * | 5/2006 | Levosky | 709/206 |
| 7,062,706 B2 | 6/2006 | Maxwell et al. | |

(Continued)

OTHER PUBLICATIONS

ENT Federal Credit Union, "Challenge Questions", retrieved on Aug. 28, 2008 from http://www.ent.com/banking/challengequestions.asp.

(Continued)

*Primary Examiner* — Omar Abdul-Ali
*Assistant Examiner* — Sherrod Keaton
(74) *Attorney, Agent, or Firm* — Robert H. Frantz; Arthur J. Samodovitz; David A. Mims, Jr.

(57) ABSTRACT

A system for automatically completing fields in online forms, such as login forms and new user registration forms, which employs a Master Cookie File containing sets of records associated with the user, his or her accounts or web sites, and registered values associated with form tags (e.g. username, password, address, email, telephone, etc.). When the user encounters another form, the MCF is automatically searched for matching values and form tags, primarily from the same account or web site, or alternatively from other accounts or sites. A flowing pop-up menu is displayed nearby the form fields from which the user can select values to automatically complete the form. Automatic account information updating, value expiration management, mapping of favorite values, and sharing of values are optional, enhanced functions of the invention.

18 Claims, 12 Drawing Sheets

(56) References Cited

U.S. PATENT DOCUMENTS

| | | | |
|---|---|---|---|
| 7,216,292 B1* | 5/2007 | Snapper et al. | 715/236 |
| 7,228,270 B2* | 6/2007 | Aso | 704/10 |
| 8,402,362 B2 | 3/2013 | Boss et al. | |
| 2002/0013788 A1 | 1/2002 | Pennell et al. | |
| 2002/0052792 A1* | 5/2002 | Johnson et al. | 705/19 |
| 2003/0179913 A1* | 9/2003 | Murase et al. | 382/119 |
| 2004/0030660 A1* | 2/2004 | Shatford | 705/67 |
| 2004/0205526 A1 | 10/2004 | Borodovski et al. | |
| 2005/0131815 A1* | 6/2005 | Fung et al. | 705/39 |
| 2005/0183003 A1 | 8/2005 | Peri | |
| 2006/0047798 A1 | 3/2006 | Feinleib et al. | |

OTHER PUBLICATIONS

Winmagic Inc., "Enterprise Full Disk Encryption Solutions", retrieved on Aug. 28, 2008 from http://www.insinova.ch/downloads/winmagicoverviewnov2006.pdf, see especially example for "password hint" as "what was your first pet's name?" on p. 38.

Nat'L Assoc. of Student Aid Administrators, "Implementation of Additional 2007-08 COD System Functionality", retrieved on Aug. 28, 2008 from http://www.nasfaa.org/publications/2007/eacodupgrade061807.html.

Novell, "Talking Passwords From CoolSolutionsWiki", retrieved on Aug. 28, 2008 from http://wiki.novell.com/index.php/Talking_Passwords.

Brand, Russell L.; "Problems with the Normal Use of Cryptography for Providing Security on Unclassified Networks ", Advances in Cryptology—CRYPTO '89 Proceedings, vol. 435/1990, retrieved on Apr. 27, 2009 from http://www.springerlink.com/content/vagb242hc2gaxh1j/.

Sun Microsystems; "Java[TM] Cryptography Extension (JCE) Reference Guide for the Java[TM] 2 Platform Standard Edition Development Kit (JDK) 5.0"; retrieved on Apr. 27, 2009 from http://java.sun.com/j2se/1.5.0/docs/guide/security/jce/JCERefGuide.html#Concepts.

USPTO, Image File Wrapper containing Office Action, Applicant Replies/Amendments and Information Disclosure Statements in abandoned U.S. Appl. No. 11/044,580, filed Jan. 29, 2005, 148 pages.

Morris, Robert et al.; "Password Security: A Case History"; Nov. 1979; Communications of the ACM; vol. 22, Issue 11; pp. 594-597.

USPTO; second office action filed on Sep. 15, 2011 in related U.S. Appl. No. 11/853,510, filed Sep. 11, 2007 by Gregory Jenson Boss.

3DREALMS.COM; "How does a computer generate a random number?", especially at page 2, third paragraph, retrieved on May 10, 2012, from http://forums.3drealms.com/vb/archive/index.php/t-11153.html.

Leach, Paul, et al.; "UUIDs and GUIDs", especially paragraph 31.5 on page 6, retrieve on May 10, 2012, from http://www.ics.uci.edu/~ejw/authoring/uuid-guids.

Lee, Justin; "How KSR broadens (without lowering) the evidentiary standards of nonobviousness", Berkeley Technology Law Journal, vol. 23:15 (2008), especially page 39, first full paragraph, retrieved on May 10, 2012.

London, Thomas B., et al.; "A UNIX[TM] Operating System for the DEC VAX 11/780 computer", Jul. 7, 1998, especially page 4, lines 22-25, retrieved on May 10, 2012 from http://cm.bell-labs.com/who/dmr/otherports/32vscan.pdf.

Patel, Viral; "Generate Random Number in UNIX Shell Script", retrieve on May 10, 2012, from http://viralpatel.net/blogs/2009/08/.

Boss, G.; recent reply to second Office Action in related U.S. Appl. No. 11/853,510, filed Sep. 11, 2007.

USPTO; first office action filed on Sep. 15, 2011 in related U.S. Appl. No. 11/853,510, filed Sep. 11, 2007 by Gregory Jenson Boss.

USPTO; Notice of Allowance mailed on Nov. 13, 2012 in related U.S. Appl. No. 11/853,510, filed Sep. 11, 2007, by Gregory J. Boss.

DI Management; "An Introduction to using Keys in Cryptography", retrieved on Dec. 13, 2011 from http://www.di-mgt.com.au/cryptokeys.html.

DI Management; "About David Ireland", retrieved on Dec. 13, 2011 from http://www.di-mgt.com.au/who_davidireland.htm.

DI Management; "About DI Management Services", retrieved on Dec. 13, 2011 from http://www.di-mgt.com.au/profile.html.

Stackoverflow; "Difference between Hashing a Password and Encrypting it", retrieved on Dec. 13, 2011 from http://stackoverflow.com/questions/326699.

Boss; reply to first Office Action in related U.S. Appl. No. 11/853,510, filed Sep. 11, 2007.

* cited by examiner

Example Master Cookie File

1200

1201 `<mcf>`
`<mcf-owner>` Bob Smith `</mcf-owner>`

1202 `<favorite-username>` bobsmith `</favorite-username>`
`<favorite-password>` mydogspot `</favorite-password>`

1203 `<cookie>`
`<website>` abc-travel.com `</website>`   `<username>` bsmith14yz `</username>`
`<password>` goplaces `</password>`   `<home-street>` 123 Baker St. `</home-street>`
`<home-city>` Bakersville `</home-city>`   `<home-state>` Texas `</home-state>`
`<home-zip>` 79111 `</home-zip>`   `<home-tel>`512-555-9999 `</home-tel>`
`</cookie>`

1204 `<cookie>`
`<account>` 19932454-5 `</account>`   `<username>` bobsm99 `</username>`
`<password>` mychecking `</password>`   `<expire>` 08-31-2005 `</expire>`
`<home-street>` 123 Baker St. `</home-street>`
`<home-city>` Bakersville `</home-city>`   `<home-state>` Texas `</home-state>`
`<home-zip>` 79111 `</home-zip>`
`<profile-URL>` www.xyz-bank.com/profile_update.asp `</profile-URL>`
`</cookie>`

1205 `<cookie>`
`<website>` www.mystocks.com `</website>`   `<username>` bobbysmith `</username>`
`<password>` nojunk `</password>`   `<home-street>` 123 Baker St. `</home-street>`
`<home-city>` Bakersville `</home-city>`   `<home-state>` Texas `</home-state>`
`<home-zip>` 79111 `</home-zip>`
`<tickers>` IBM, JNJ, XOM `</tickers>` `<headlines>` nanotechnology, retirement `</headlines>`
`<profile-URL>` www.mystocks.com/account_info.htm `</profile-URL>`
`</cookie>`
...
`</mcf>`

*Fig. 3*

SYSTEM AND METHOD TO CAPTURE AND MANAGE INPUT VALUES FOR AUTOMATIC FORM FILL

CROSS-REFERENCE TO RELATED APPLICATIONS (CLAIMING BENEFIT UNDER 35 U.S.C. 120)

None

CROSS-REFERENCE TO RELATED APPLICATIONS

None

FEDERALLY SPONSORED RESEARCH AND DEVELOPMENT STATEMENT

This invention was not developed in conjunction with any Federally-sponsored contract.

MICROFICHE APPENDIX

Not applicable

INCORPORATION BY REFERENCE

None

BACKGROUND OF THE INVENTION

1. Field of the Invention

This invention relates to technologies for managing registered information for users of online accounts, and especially to technologies for filling and completing fields in electronic forms.

2. Background of the Invention

As the Internet has grown in popularity, and as it has become accessible to many individuals through private "home" computers, company computers, and Internet-enabled mobile devices such as Personal Communications Systems ("PCS") wireless telephones and wireless-networked Personal Digital Assistants ("PDA"), literally thousands of service providers have deployed websites which require users to create an "account" with them. These web sites provide customized news, investment information, travel services, messaging services, genealogy mapping, classmate finding, online shopping, electronic banking, insurance claims management, and literally thousands more options, all from the convenience of the user's home, desk, or mobile device.

With so many users employing the Internet as a way to manage personal data and household financial information, consumers redundantly register numerous pieces of vital account information with various companies each day, often to gain access to these free services or subscriptions. This information often includes actual user's name, an account username, address, social security number, telephone numbers, email addresses, and even personal profile information such as gender, birth date, brand preferences, vocation, hobbies, food preferences, etc. Many sites also either assign a password to each new user, or allow the user to select a password within some constraints, such as minimum character length. Typing or entering repetitive information in this manner is not only tedious, but also drastically reduces the customer acceptance process.

As an individual's account information can be accessed via the Internet, more companies encourage their consumers to go paperless to reduce overhead costs and provide personal data at the user's convenience. From a user's perspective, the process of registering and maintaining personal login identification and password becomes cumbersome. Furthermore, since each person may have multiple accounts, tracking and managing such account information can be problematic.

Several problems arise as user's create accounts with numerous web sites and web services. First, it may become difficult to remember all of the various account usernames, especially for the sites which automatically assign an account username to each new user. For example, a user whose actual name is John A. Smith may be assigned an account username of "jasmith99X2", or even an account username including a variation of a domain name, such as "jasmith99x2<@>hypothetical_isp<.com>". (Due to the U.S. patent restrictions from including browser-executable code, such as actual domain names, we will use throughout this disclosure left and right bracket characters "<" and ">" to mark such text to prevent it from being executed by a web browser. But, in reading this disclosure, these bracket characters can be ignored.) In this example, a seemingly random set of characters has been added to an abbreviation of the user's actual name in order to distinguish it from the pre-existing account usernames already established with the service. So, a single user may accumulate a large number of assigned account usernames from a variety of services, such as "jasmith99x2", "johns321a", "jas1441qqr", etc.

Some web sites, though, allow a user to select or pick his or her own account username, which leads to two problems. If the user's preferred account username is a common selection, the user may resort to experimenting with many variations of his or her preferred account user name until an available name is found. This often leads to the same type of variation of account username as just discussed (e.g. a string of characters related to the preferred name concatenated with some distinguishing characters).

But, if the user's preferred name is available, a second problem may arise in that the user may, and often does, select the same account username he or she has for one or more other web services. For example, if our example user John A. Smith has a fairly uncommon middle name, perhaps Arsenio, he may be able to select this as his account username on a number of unrelated web site accounts. While this is more convenient for the user in that it is easier to remember the account names, it presents a security risk to the user if the account username is ever compromised. For example, consider John Arsenio Smith creates an onlinebanking account with www<.>bigbank<.>com with an account username of "jarsenios". It can be expected that the bank's online account system would be highly secure and hacker-safe. However, if this user also creates a personal travel planning account with www<.>cheaptrips<.>com, and selects the same account username of "jasrsenios". This web site operator, however, may not consider their services to warrant strong protection from hackers, and may not even employ secure login procedures such as Secure Socket Layer ("SSL"), Secure Hyper Text Transfer Protocol ("HTTP S"), or Public Key Infrastructure ("PKI") technologies. This may expose the user's favorite account username during login to snooping, which would subsequently allow another person to access the user's online bank accounts as well as any other online services having the same username.

Likewise, the same problems exist with passwords for online accounts. A large number of assigned passwords allow for greater security from account to account should one of the passwords be compromised, but may be difficult for the user to remember all of the passwords, which may result in the user writing or storing all of them in a common area (e.g. on a paper note in a desk drawer, in a note in a PDA, or in a password manager file). If the repository of collected passwords is ever compromised, the user's various accounts are vulnerable to unauthorized access. Conversely, the user-selected passwords will tend to fall into a few favorite values such as favorite color, spouse's or pet's name, college mascot, etc. Again, like the account username problem, if a common password is compromised, it may allow a hacker to access more than one account.

Therefore, there is a need in the art for a system and method for establishing or selecting account usernames which do not have common or recurring values, but which allows the user to avoid remembering or recalling a wide variety of difficult to remember (e.g. non-logical) values. Additionally, there is a need in the art for this system and method to provide adequate security from complete compromise if the central repository is compromised.

Internet users are more and more sophisticated in their understanding of hacker's techniques, and to the simple security oversights made by software manufacturers, web site operator, and service providers such as banks, utility companies, airlines, etc. Hardly a week passes where a new security flaw in a common operating system is announced, a new successful virus or worm is released, a new spyware is discovered, or a company is caught not protecting their clients' and users' personal data, including usernames and passwords.

Additionally, many users often need to allow other people access to their online accounts, even if for a limited purpose or time. For example, a manager at a company may be on a business trip, and may need to transfer some funds from an investment account to a checking account. If he or she does not have access to the Internet, he or she may call a secretary or spouse, give them the website address, their usernames and password, and ask for them to make the transfer online for them.

As a result, some user's expect that their passwords and even usernames will be comprised over time, so they routinely change their passwords and/or account usernames. Some online accounts, however, do not allow the account username to be changed, so the user's may actually close the old account and create a new one.

This process of manually managing accounts, usernames, and passwords through changes over time only accentuates the aforementioned problems.

Therefore, there is a need in the art for a system and method for establishing or selecting account passwords which do not have common or recurring values, but which allows the user to avoid remembering or recalling a wide variety of difficult to remember (e.g. non-logical) values. Additionally, there is a need in the art for this system and method to provide adequate security from complete compromise if the central repository is compromised.

One attempt at solving this information management problem that exists today is embodied in browsers such as Microsoft's™ Internet Explorer™ ("IE"), which "remembers" all the text which a user has typed previously into web forms. This data is then shown in a drop-down menue when a user enters his/her registration information, but the user must select which data to use if multiple data exists. In addition, the drop-down data may include information previously entered by other users of the same computer, which leads to a potential security lapse. Furthermore, the user still has the problem of managing multiple account login data in a potentially insecure fashion.

Other known attempts at solving this problem includes Google's™ "AutoFill" technology, and similar processes. These processes are designed to automatically complete web forms, including login screens, but actually have numerous limitations upon closer analysis. Firstly, a user's personal information is stored on each user's local computer, with their corresponding security issues and convenience limitations (e.g. the user's data input originally on one computer would not be available when the user logs in from another computer). Secondly, AutoFill requires web page authors to define field names using the Electronic Commerce Modeling Language ("ECML") standard, and currently there are only limited fields that AutoFill can complete. As a result, most registration and log in pages today are not compatible. AutoFill is also not National Language Support ("NLS") enabled, as it only supports English at this time.

The problem outlined has created much frustration and inconvenience, and some users have actually created data repository, such as a Lotus™ Notes™ database, to help handle this problem. However, this method has a number of drawbacks, including dependency on a computationally-intensive application (e.g. Lotus Notes), and laborious manual steps being required to input the information. Additionally, such methods lack browser integration to automatically record filled data or fill forms, ability for fast search or selective view on relevant data based on the form, as well as convenient user interfaces to enable user to perform form fill tasks quickly. FIG. 1 provides a screen shot (3) of a portion of a computer display (2) upon which a typical user's local Notes database with over 900 sets (4) of account usernames (e.g. "IDs") (5) and passwords (6). FIG. 1 only shows entries for the letter "A" with password column (6) collapsed.

Therefore, there is a need for a system and method to address the foregoing problems and limitations of the existing art in a manner which provides more convenience to a user who has a plurality of account and web site usernames and passwords, and who repetitiously registers for new accounts and profiles online. There further exists a need in the art for this new system and method to provide ample security to avoid reusing portions of username and password strings in multiple login parameters, without causing great inconvenience to the user to remember or record a variety of greatly disparate login parameter values.

BRIEF DESCRIPTION OF THE DRAWINGS

The following detailed description when taken in conjunction with the figures presented herein present a complete description of the present invention.

FIG. 3 provides an example Master Cookie File according to the present invention.

SUMMARY OF THE INVENTION

Figure 1:
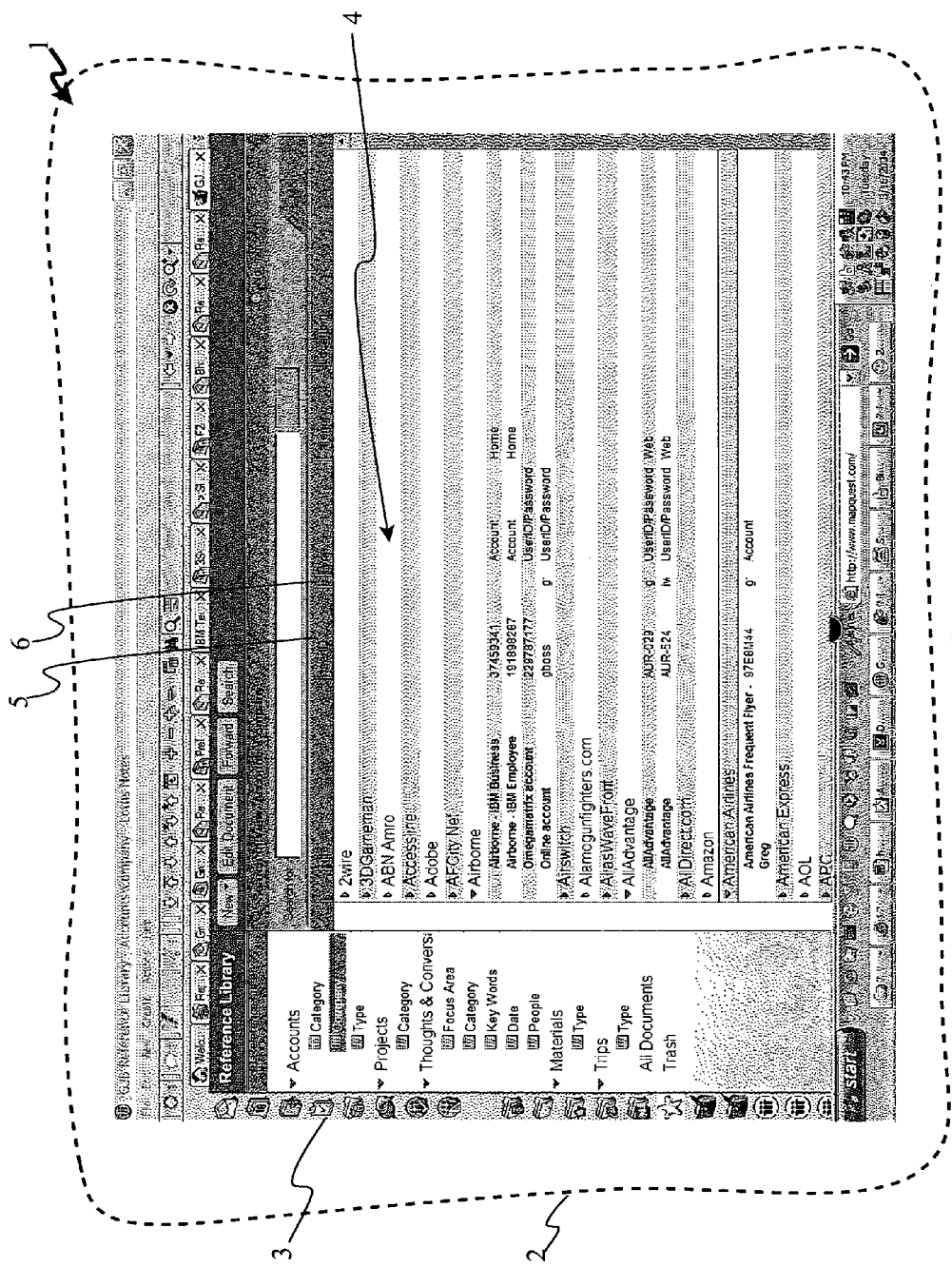
FIG. 1 shows an example database that a user may build or configure to store his or her many account usernames and passwords.

The present invention provides a server storage option, in addition to a local storage option, which allows a user quick personal data retrieval for application to any registration sites or any input fields such as log in forms, new account set up forms, etc. The invention works with any natural language (e.g. English as well as non-English), and users can customize their own entries and store any information they like without dependency on web page authors.

This invention consists of a method and process for a user to keep a local or server storage file of his or her own registration information, such as usernames and passwords, optionally encrypted or compressed for security or storage optimization purposes. A flowing pop-up menu is provided next to a registration form, or at each specific field in the form, thereby allowing the user to quickly select the desired value from the stored personal information, and to easily fill in germane information in the form. The user can also easily enable/disable this function by a right-mouse click (or otherwise indicate disablement) on the input field of the form.

When the user visits a registration web page requiring information, known fields will be automatically populated by the invention through prompting the user for confirmation on validity of the data. The data is correlated to attributes (URL, web page title, IP, form object, etc.) and stored in a personal information repository to track information provided to registration site.

Besides the convenient and configurable flowing pop-up menu, the present invention differs from existing form-fillers such as Google AutoFill because users do not need to input information ahead of time. Further, the invention does not require web pages to be created or encoded using a standard language, such as the sparsely-used ECML standard.

To further enhance the ease of logging into a web site, the present invention provides a Master Cookie File which allows the user to map his or her preferred username and password to a plurality of usernames and passwords which are registered with a plurality of accounts and websites. During a log in process, the user is prompted to enter his or her preferred or universal username and password, which is then mapped by the invention to a specific username and password for the relevant web site, and the invention submits these specific parameters to the website to accomplish the login such that the user is not inconvenienced to remember a plurality of login names and passwords.

According to one advanced aspect of the present invention, the invention remembers the web sites where a user has set up accounts in the past, and when the user changes personal information for one web site or account, the invention automatically updates the user's information at the other accounts and web sites. This allows the user to keep his or her registration information current with multiple accounts and web sites without having to log into each account and manually make the changes.

According to another advanced aspect of the present invention, during initial registration for a new online account, the invention algorithmically suggests or automatically selects alternate username and password values to assist the user in employing a greater variety of login and authentication parameters. Most users will repetitiously use variations of predictable strings, such as their name, their pets name, etc., especially when their preferred login parameters are not available (e.g. they are already taken by other users of the same web site or they do not meet certain criteria such as minimum length). Thus, the present invention enhances security for the user by employing a greater variety of usernames and passwords, thereby making it difficult for an unauthorized user to access more than one account if the account parameters for one account are compromised.

According to another advanced aspect of the present invention, the user may specify an expiration period for each mapped password and username for a specific account or web site. The invention then automatically updates or changes the password and/or username prior to expiration of the existing username and password, and updates its own mapping so that the user can continue to use his or her own preferred username and password while having the invention map it to specific usernames and passwords for specific web sites automatically and transparently.

According to another advanced aspect of the present invention, the method provides for a temporary password and username mapping such that the user can create a password and username to give to another person (e.g a secretary or assistant). The invention "shares" a portion of the user's Master Cookie File with a temporary user's Master Cookie File, and when the temporary user attempts to log into the web site, the invention maps the temporary username and password to the real user's username and password to accomplish log in without divulging the real user's log in parameters to the temporary user. If the user has selected an expiration time or date, the invention will cease to provide the mapping after the expiration date or time has been reached, thereby disabling the temporary or guest user's ability to log into the user's account(s).

DETAILED DESCRIPTION OF THE INVENTION

In order to address the problems described in the foregoing paragraphs, the present invention provides a new solution for automatic form filling using the following general logical functions which will be described in further detail in the following paragraphs:

(a) the invention creates a Master Cookie File ("MCF") for storage of personal information and mappings from preferred login parameters to web-site-specific and account-specific login parameters, instead of tracking multiple cookies for individual web pages (URLs) in wholly separate cookie files such as is performed by many web browsers of the current technology;

(b) the logical functions of the present invention are embodied preferably as a plug-in to a web browser program, such as IE or Netscape's Navigator™, which keeps site-specific and account-specific cookies for ID and password tags (either HTML, XML, etc.) and them in the MCF;

(c) other stored tags optionally include account number tags and other information, also stored in the MCF, which are used by the plug-in to update a plurality of registrations at a plurality of web sites, as well as assists in form filling during registration of a new account; and (d) optionally, the user may define other tags which he or she repetitiously must complete, such as broker registration number for certified securities or stock broker.

The present invention, therefore, provides a number of advantages to the user as compared to currently-available technologies, tools and techniques:

(1) the invention allows a user to easily manage multiple registration information and login unique identifiers;

(2) the invention maps a user's favorite or preferred username and password to a plurality of account-specific and web-site-specific usernames and passwords to allow the user the convenience of using the same login parameters across many accounts and sites without the security risk of actually doing so;

(3) the invention provides centralized storage for user to track and manage multiple accounts; and (4) the invention automatically checks to verify usage of the user's latest and most up-to-date registration information, and can optionally automatically update other accounts when information changes;

Suitable Computing Platform for Realization of the Invention

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 4:
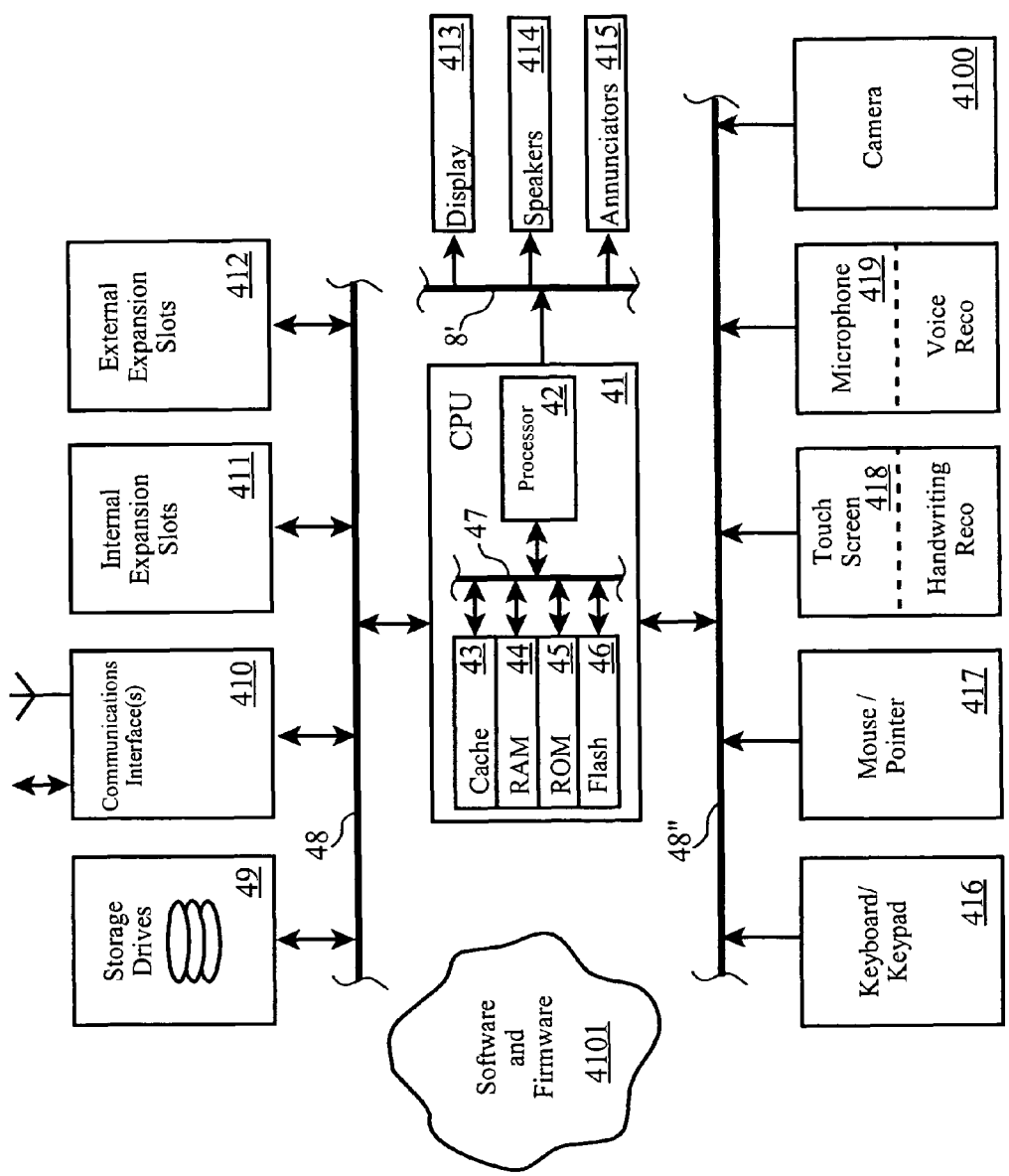
FIG. 4 depicts a generalized computing platform architecture, such as a personal computer, server computer, personal digital assistant, web-enabled wireless telephone, or other processor-based device.

Turning to FIG. 4, a generalized architecture is presented including a central processing unit (41) ("CPU"), which is typically comprised of a microprocessor (42) associated with random access memory ("RAM") (44) and read-only memory ("ROM") (45). Often, the CPU (41) is also provided with cache memory (43) and programmable FlashROM (46). The interface (47) between the microprocessor (42) and the various types of CPU memory is often referred to as a "local bus", but also may be a more generic or industry standard bus.

Many computing platforms are also provided with one or more storage drives (49), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (410), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (411), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (412) allowing the user the ability to easily install and remove hardware expansion devices, such as PCMCIA cards, SmartMedia cards, and various proprietary modules such as removable hard drives, CD drives, and floppy drives.

Often, the storage drives (49), communication interfaces (410), internal expansion slots (411) and external expansion slots (412) are interconnected with the CPU (41) via a standard or industry open bus architecture (48), such as ISA, EISA, or PCI. In many cases, the bus (48) may be of a proprietary design.

A computing platform is usually provided with one or more user input devices, such as a keyboard or a keypad (416), and mouse or pointer device (417), and/or a touch-screen display (418). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (418) is usually provided, often with handwriting recognition capabilities.

Additionally, a microphone (419), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (4100), such as a still digital camera or full motion video digital camera.

One or more user output devices, such as a display (413), are also provided with most computing platforms. The display (413) may take many forms, including a Cathode Ray Tube ("CRT"), a Thin Flat Transistor ("TFT") array, or a simple set of light emitting diodes ("LED") or liquid crystal display ("LCD") indicators.

One or more speakers (414) and/or annunciators (415) are often associated with computing platforms, too. The speakers (414) may be used to reproduce audio and music, such as the speaker of a wireless telephone or the speakers of a personal computer. Annunciators (415) may take the form of simple beep emitters or buzzers, commonly found on certain devices such as PDAs and PIMs.

These user input and output devices may be directly interconnected (48', 48") to the CPU (41) via a proprietary bus structure and/or interfaces, or they may be interconnected through one or more industry open buses such as ISA, EISA, PCI, etc. The computing platform is also provided with one or more software and firmware (4101) programs to implement the desired functionality of the computing platforms.

Figure 5:
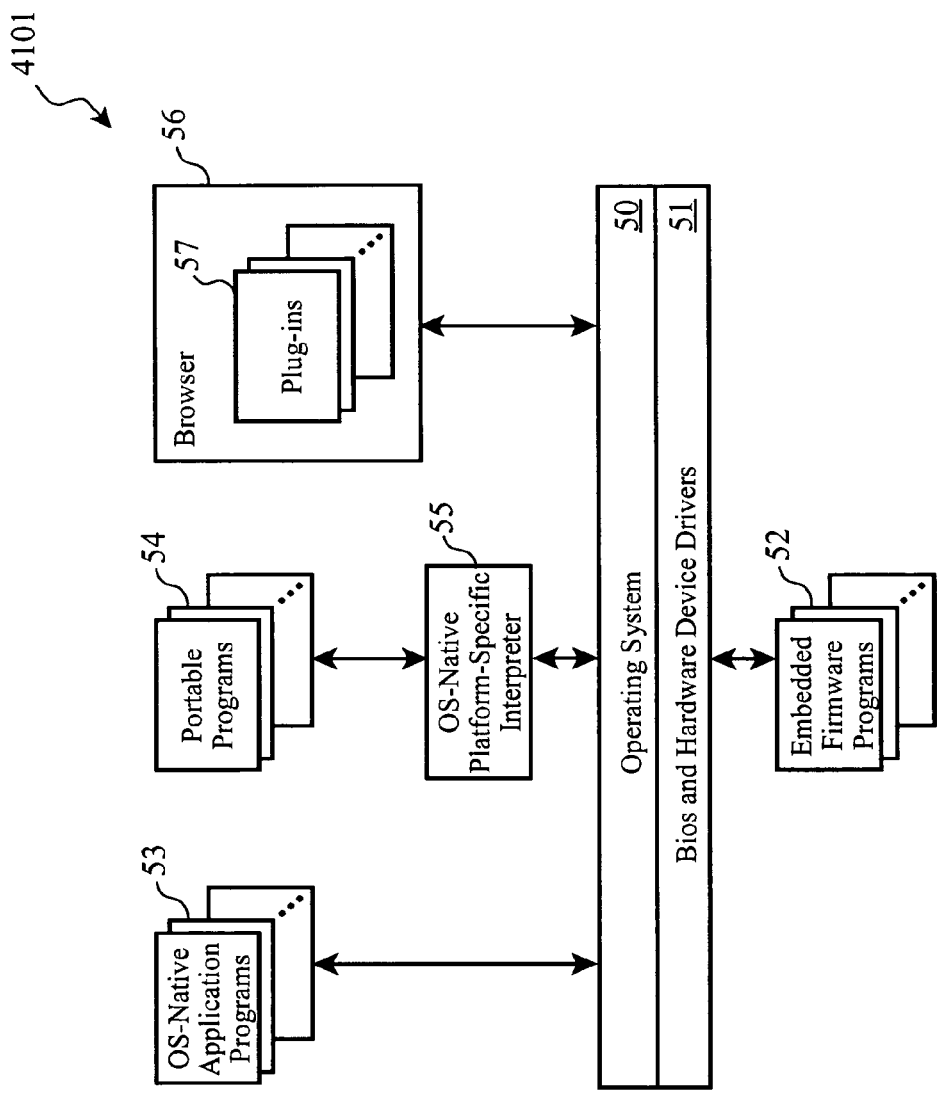
FIG. 5 shows a generalized organization of software and firmware associated with the generalized architecture of FIG. 4.

Turning to now FIG. 5, more detail is given of a generalized organization of software and firmware (4101) on this range of computing platforms. One or more operating system ("OS") native application programs (53) may be provided on the computing platform, such as word processors, spreadsheets, contact management utilities, address book, calendar, email client, presentation, financial and bookkeeping programs.

Additionally, one or more "portable" or device-independent programs (54) may be provided, which must be interpreted by an OS-native platform-specific interpreter (55), such as Java™ scripts and programs.

Often, computing platforms are also provided with a form of web browser or micro-browser (56), which may also include one or more extensions to the browser such as browser plug-ins (57).

The computing device is often provided with an operating system (50), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (51) are often provided to allow the operating system (50) and programs to interface to and control the specific hardware functions provided with the computing platform.

Additionally, one or more embedded firmware programs (52) are commonly provided with many computing platforms, which are executed by onboard or "embedded" microprocessors as part of the peripheral device, such as a micro controller or a hard drive, a communication processor, network interface card, or sound or graphics card.

As such, FIGS. 4 and 5 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Base Logical Processes of the Invention

Figure 6:
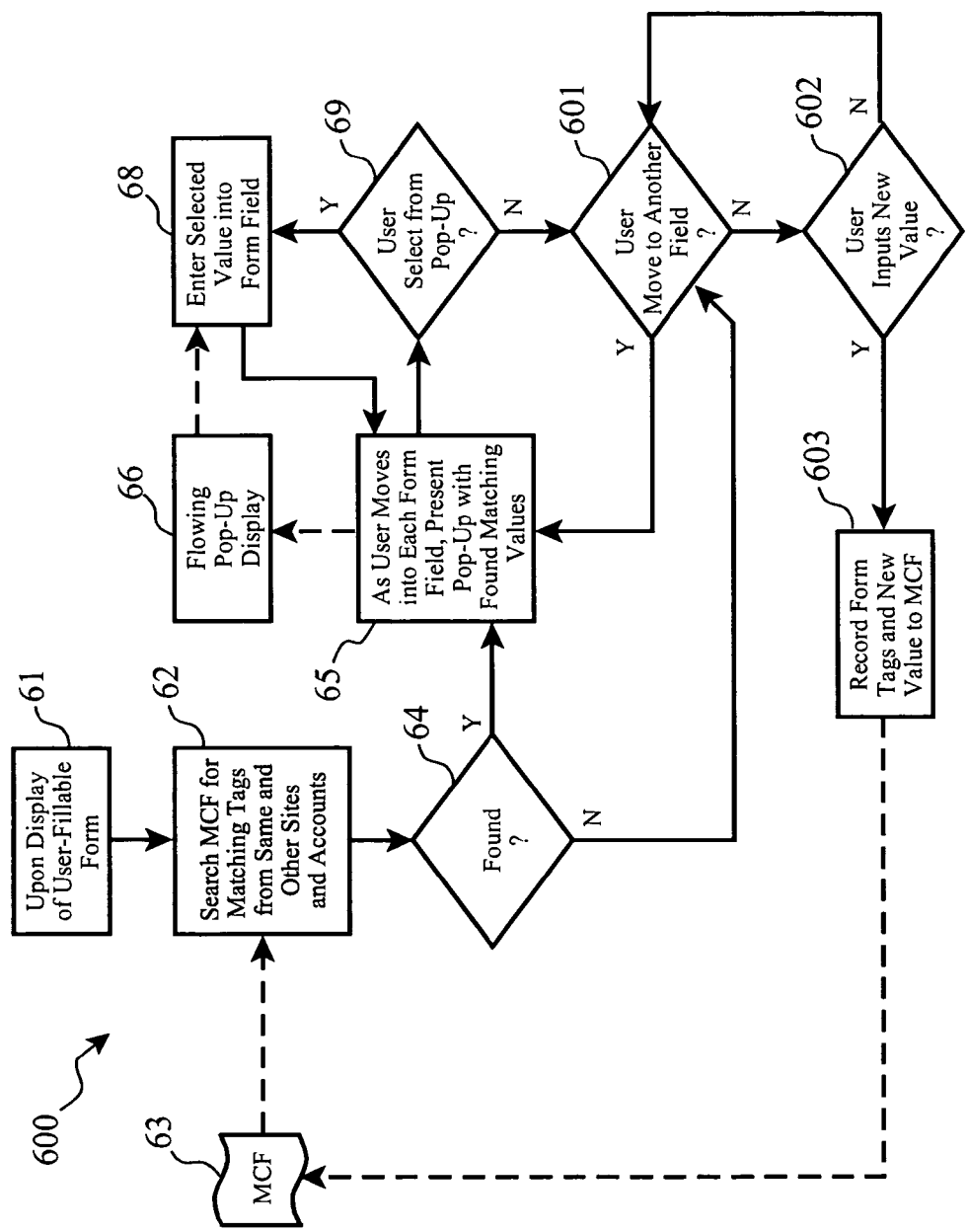
FIG. 6 illustrates a logical process according to the invention for the base functions of the invention.

Turning now to FIG. 6, a first logical process according to the invention is illustrated, wherein a generalized form is filled by a user with assistance from the invention. The invention (or the main web browser code) constantly monitors the displayed information to the user. When a form is being displayed (61), which can be detected by the HTML coded into the currently displayed page, the MCF (63) is searched (62) to find any previous entries from other websites or the same website corresponding to any of the fields in the currently-displayed form.

If any are found (64), then as the user moves from field to field (65), the flowing pop-up ("FPU") display or menu (66) is provided nearby each field while the user has pointed to or moved into each field. If the user selects (69) an item from the FPU, this value is entered (68) by the invention into the field where the user is pointing, or where the cursor is currently located.

If the user moves to another field (601) without making a selection from the FPU, the FPU is updated with values matching the new field's tag from the MCF, if one is found.

If the user manually inputs a new value in a form field, the invention detects this new value (602), and adds that form tag and the new value into the MCF, preferably along with an indication that this is associated with the current account or web site where the currently displayed page resides.

Figure 7:
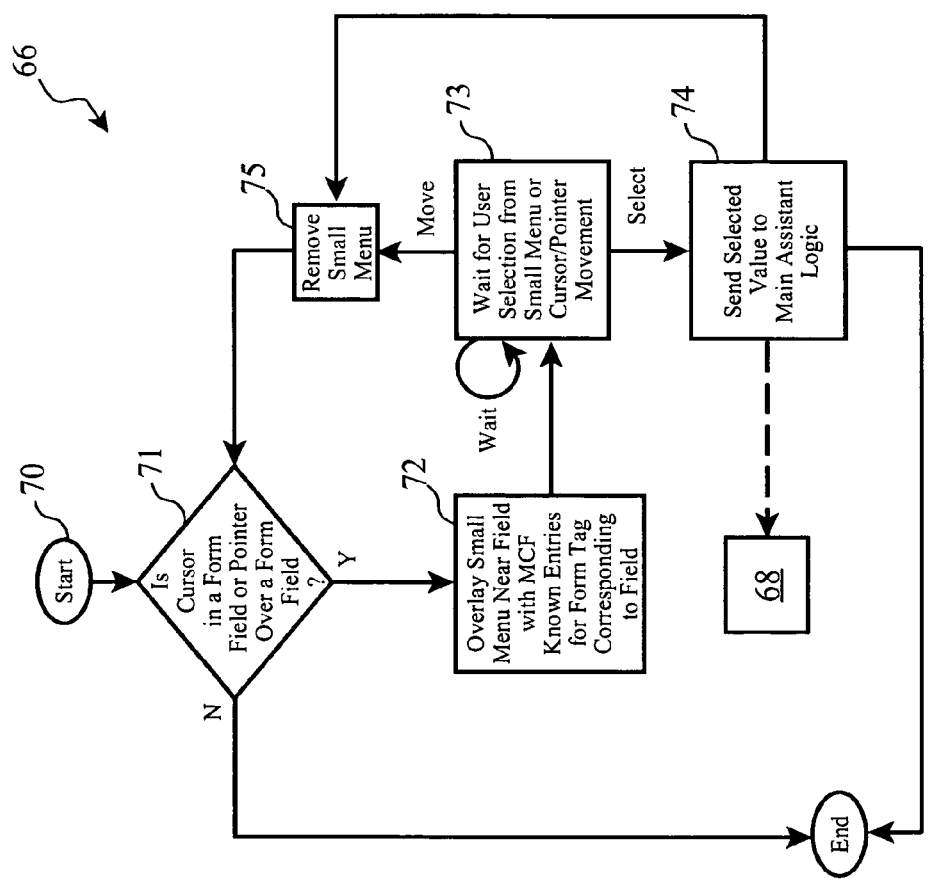
FIG. 7 provides more details for a logical process according to the invention to provide a new Floating Pop-up Menu.

Turning now to FIG. 7, more details of the logical process (66) of the flowing pop-up menu are provided. In appearance to the user, the FPU menu works similarly to what is known in the art as "flyover information boxes". When the user clicks or tabs into a form field, or moves the pointer over the form field, the menu is automatically displayed near the field and overlaid on the current screen contents. As the user moves away from the field, the FPU is removed and the display is returned to normal, unless another FPU menu for another field is displayed.

In practice, however, fly over information boxes contain static information usually programmed into the application program with fixed values, such as explanations of what an icon does. In the present invention, this is not suitable as the information to be displayed varies from user to user, site to site, and field to field, based upon the contents of the user's MCF. So, according to our process, when the cursor or pointer is over or in a form field (71), a small menu is displayed (72) near or adjacent to the field containing the MCF values which are associated primarily with the same web site or account, and with the form field tag (e.g. username, account number, password, telephone number, etc.). If no entry for the current web site, URL or account exists in the MCF, then one or more entries for the same tag from other web sites, URLs or accounts is shown in the menu. Preferably, all matching entries or values are shown, with the one for the current web site or URL highlighted, placed first in the list, or otherwise displayed more prominently than the other choices.

The process then waits for the user to select an entry from the FPU, or to move away from the field. If a selection is made (74), the selected value is returned to the main assistant logic (68), and the process ends (75), and the FPU is preferably removed from the display.

If the user moves the pointer or cursor away from the field without making a selection, the FPU is removed (75) from the display.

In practice, the FPU can be displayed and/or removed using a quick overlay (e.g. suddenly overwriting the display), or may be done using a gradual displaying technique such as a reverse-dissolve and dissolve operation, fade operation, etc.

Figure 2:
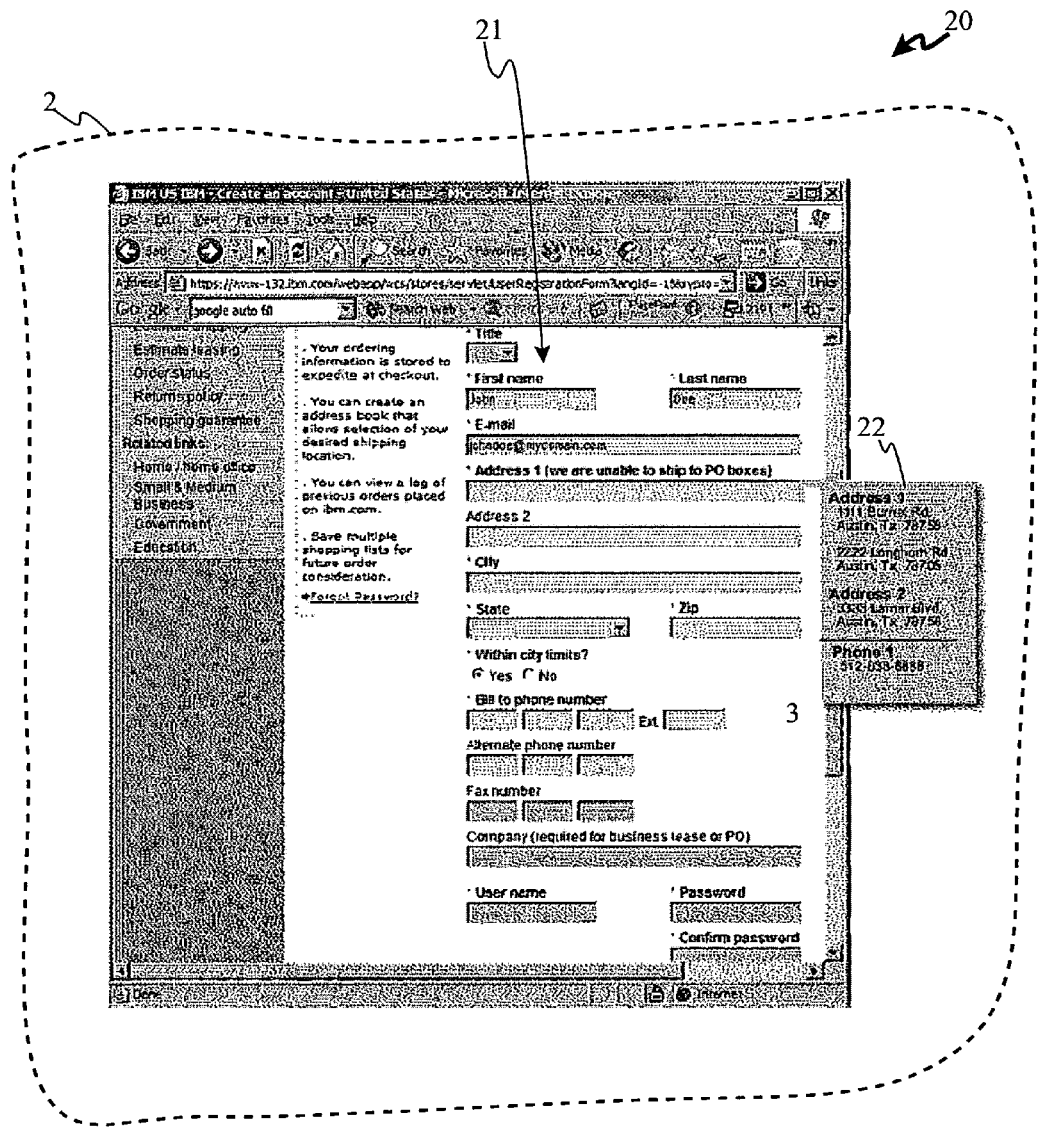
FIG. 2 illustrates our Flowing Pop-up menu user interface.

FIG. 2 provides an illustration (20) of one embodiment of our FPU menu, in which a registration form (21) is displayed, where the user is expected to input a set of typical values such as first name, last name, email, address, etc. In this illustration, the user has moved the cursor into the Address 1 field, which has resulted in the invention displaying the FPU menu (22) along side the Address 1 field, in which all address values found in the user's MCF are shown and are selectable by the user. This example display shows the user's information sorted by address value, but optionally, the information can be sorted by any suitable parameter or characteristic, such as category, age of information, alphabetical order, etc.

Master Cookie File

Master Cookie File ("MCF") is preferably stored by a networked server and associated with a particular user. This embodiment enables the user to use any networked computer as a client with the associated browser plug-in as previously described, not just his or her own personal computer. In this arrangement, the browser plug-in running on the user's local computer would access the user's MCF on the remote server via a computer network, such as the Internet, preferably using a secure protocol such as secure sockets.

Alternatively, the MCF may be stored locally on the user's computer, and the web browser plug-in is configured to access the local MCF instead of a remotely stored MCF. Even if stored locally, our preferred embodiment includes encryption of the MCF to prevent unauthorized access to the information stored therein. According to one aspect of the preferred embodiment in order to enhance security, each MCF, or optionally each MCF entry, may self-destroy or self-deactivate at a certain time or age, following a certain amount of inactivity or nonuse, or when the user terminates a browsing session (e.g. logs out, shuts down the system, etc.). This enhancement provides for more secure use in environments and situations where the MCF is temporarily stored or cached on a computer.

For ease of understanding, FIG. 3 provides an example MCF (1200), wherein information is stored in association with a user (1201), a web site or account, and various form tags. This example MCF also includes a favorite username and password (1202) for the enhanced mapping function of the invention, which is part of an optional embodiment and is described in more detail in the following paragraphs.

The MCF information may be encoded in any digital or computer-readable format is required, such as into a format of a cookie or other digital file. We have shown a mark-up language example here, but other suitable formats may be employed as well. In this example, the owner of the MCF is shown as "Bob Smith" (1201), and his favorite username and favorite passwords are "bobsimth" and "mydogspot" (1202). Mr. Smith has an account online with "abctravel" (1203), where his username is "bsmith14yz" and password is "goplaces", and where he has registered his home address and telephone number.

Mr. Smith also has an online account with his bank (1204), "xyz-bank", where his account number is 19932454-5, his username is "bobmsm99", and his password is "mychecking". He has also registered his home address with this account, as well as the invention has recorded the URL of the page where he can update his personal information. This last bit of information can be used by another optional embodiment of the invention, wherein the invention automatically updates all of Mr. Smith's personal account information for him when one or more items change, as described in more detail later.

Additionally, Mr. Smith has an account with a "mystocks" website service, where his username is "bobbysmith", his password is "nojunk", his home address is registered, and he has input stock ticker symbols of interest for International Business Machines, Johnson & Johnson, and Exxon-Mobil. He has also entered keywords for headline searchs of "nanotechnology" and "retirement".

As shown in this example, the MCF may include a plurality of cookies or entries for many more accounts (more or less than shown in this example). As previously described, when the user Bob Smith accesses a web page which has a form in it, the MCF is searched first for matching entries for the specific URL or web site, and second for matching form tags. As such, these pre-recorded form field values can be retrieved from the MCF and presented to Mr. Smith in the flowing pop-up window as previously described.

Value Selection Assistant

Figure 8:
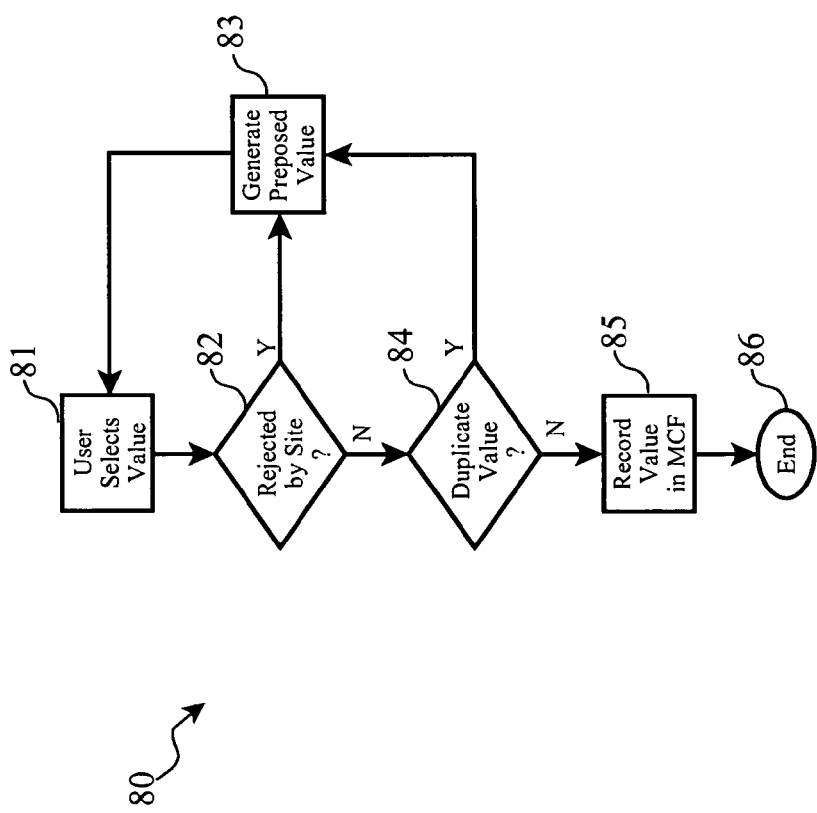
FIG. 8 depicts a logical process according to the invention for assisting the user or autonomously selecting new values for registration with online accounts and services.

Turning now to FIG. 8, our logical process (80) of one optional aspect of the invention is shown. This aspect need not be present in all embodiments of the invention, but is highly useful for relieving the user of the burden of remembering or using a plurality of different usernames and passwords.

For example, when our hypothetical user "Bob Smith" establishes his new account with ABC-Travel, he may attempt to obtain (81) his favorite username "BobSmith". This username may either be unavailable at ABC-Travel (e.g. already taken) (82), or the invention may optionally detect (84) that it is a duplicate of another username and presents a security risk, so the invention proposes (83) a site-specific username of "bsmith14yz" using a value generation process (83). The value generation process may include a process which appends or prepends a predetermined user challenge question answer (a.k.a. "detective answers") string values (e.g. birthdate, pet name, school mascot, etc.), or pseudo-random strings to the requested or preferred string value to create a string which is a variant of the preferred value (as in this example), or may employ another process such as an entirely random value generator or a pre-defined sequence of values.

Once an available, non-duplicate value is selected, it is recorded (85) in the MCF in association with the user and the account or website. This process can be useful for selecting a username and a password, but may also be employed for other user-selectable values such as screen names, buddy names, etc.

Favorite-to-Specific Mapping Function

Figure 9:
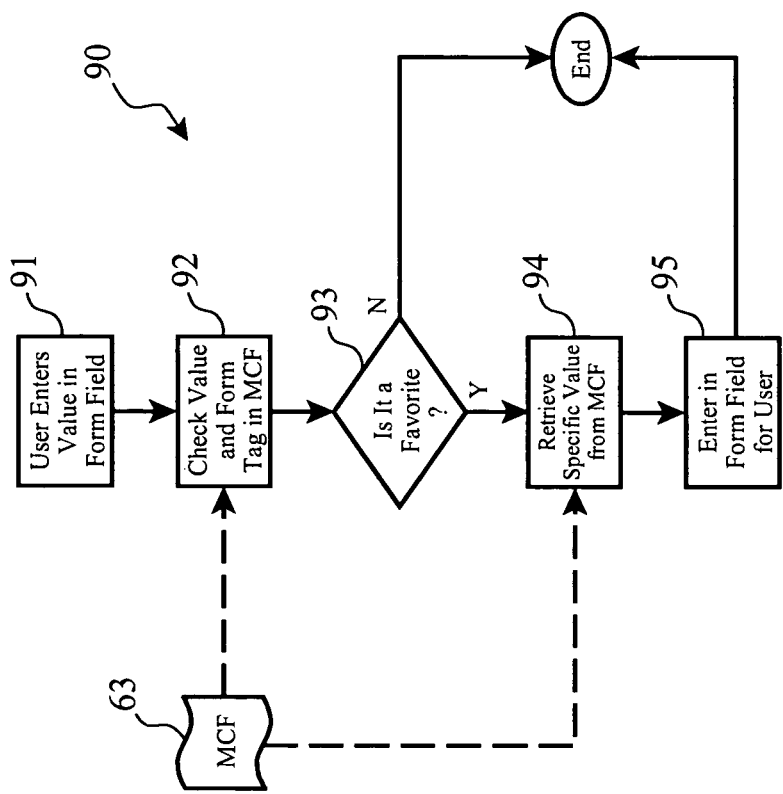
FIG. 9 provides details of a logical process according to the invention for mapping a user's favorite form values to site-specific or account-specific values.

Turning now to FIG. 9, another optional aspect of the present invention is illustrated wherein the plurality of site-specific and account specific values are automatically mapped from the user's favorite values. When a user enters (91) a value into a form field (or selects a value from a FPU menu), the MCF (63) is checked (93) to see if it is a favorite value (1202 from FIG. 3). If it is a favorite value, then the invention accesses (94) the MCF to find a corresponding account-specific or site-specific value, and enters that value into the form for the user, thereby allowing the user to remember only his or her favorite values but keeping the security of a plurality of different values across a plurality of accounts and web sites.

As in our example for "Mr. Smith", when he points his browser to the ABC-Travel web page (referring to the MCF of FIG. 3), he may enter "bobsmith" into the username and "mydogspot" form fields to log into his account. Normally, this would be rejected by the ABC-Travel authentication process, as these are not his correct username and password.

However, the invention detects these entries, determines that these are favorite values from his MCF, and substitutes them for "bsmith14yz" and "goplaces", respectively, in the form fields. Thus, he is able to log into his account seemingly with his favorite username and password, but while actually maintaining a wide variety of values across all of his accounts.

In another manner of use, a user may define a favorite as a form of short hand entry. For example, our user "Mr. Smith" has three stocks of interest—IBM, J&J, and Exxon-Mobile. Using the basic invention, he may easily select these from a FPU menu to enter them into an appropriate stock quote request form. However, he may also define a <favorite-tickers> tag in his MCF of "kids stocks" if these are stocks held in his children's accounts, for example. Then, he can just enter "kids stock" in the ticker search form field, which will be detected by the invention as a favorite and substituted for the string "IBM, JNJ, XOM".

In other variations of use and embodiment of the favorite-to-mapping function, browsing control can be achieved similar to parental controls and Internet firewall/gateway functions, wherein the MCF can specify redirections to values which may be offensive, high security risk, or otherwise undesirable to actually visit. For example, a pornographic web site address or URL could be mapped to an acceptable web site address (e.g. map playboy<dot>com to cnn<dot>com). In another example, a web site known to download spyware or viruses can be mapped to trustworth web site address.

Automatic Maintenance of Registered Information

In another optional and enhanced aspect of the present invention, the user's registered information is automatically updated when the invention detects (or is instructed) that some of the information has been changed.

For example, consider Mr. Smith and his MCF of FIG. 3. His home address is registered at three different accounts or websites as shown, and in practice, may actually be registered at many more places (e.g. bank, investment firm, travel service, ISP and email account, online bill paying, etc.).

So, traditionally, when Mr. Smith moves his residence, he would have to visit each of these web sites, log into each account, navigate to the appropriate account update page, enter the new address information, and save it. While using the base invention disclosed herein would greatly improve this process by aiding the log in process and the form filling process, according to another enhancement of the invention, this can be done completely automatically as well.

Figure 10:
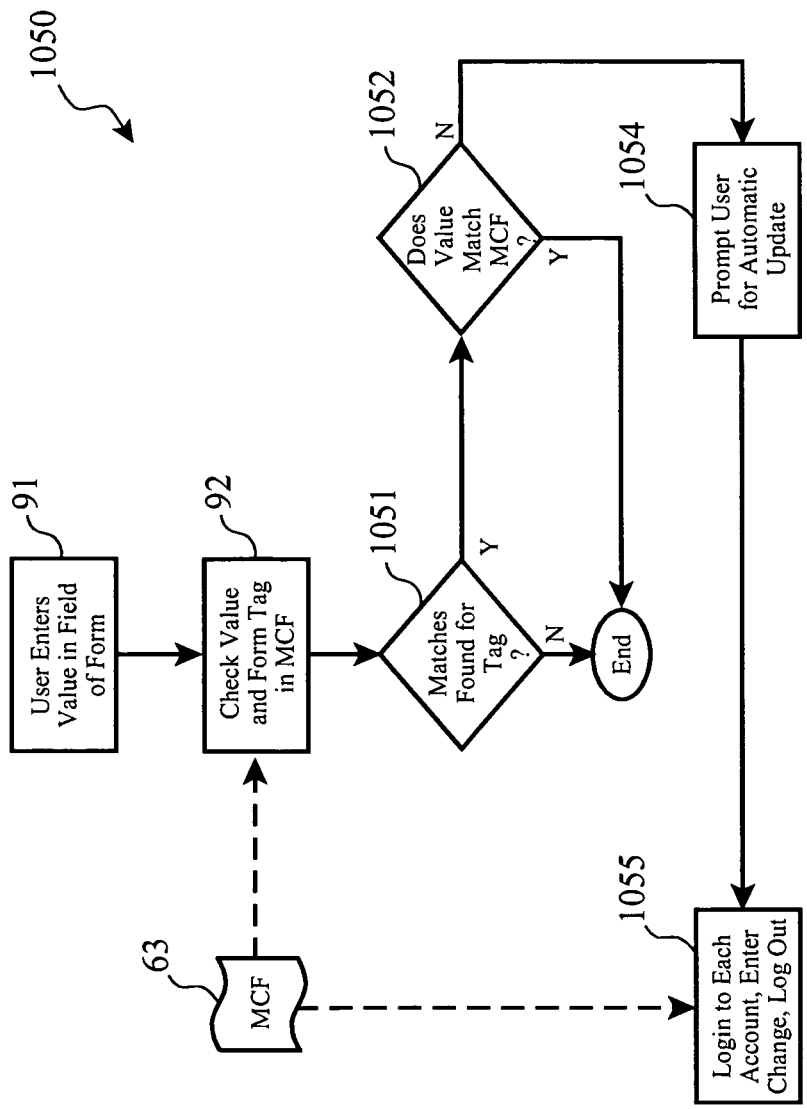
FIG. 10 shows details of a logical process according to the invention for automatically detecting changes to a user's registered information, and automatically updating that information with other online accounts and web sites.

For example, in Mr. Smith's MCF for his MyStocks account a record has been made that he has updated his account information once before, and this web page address has been recorded (see the profile-URL tag entry). As shown in FIG. 10, our logical process (1050) provides that when Mr. Smith logs into any account and either updates or registers information (91), it is compared (92, 1051, 1052) to other entries in his MCF (63). If the new value(s) do not match the older values at other accounts and websites, the user is prompted (1054) whether or not he or she wishes all other accounts to be updated to match this information. If answered in the affirmative, the system then records the new values associated with the new or updated account, and then proceeds to automatically log into each other account and make the appropriate value changes (1055). This is done preferably by using each accounts' recorded username, password, and profile update address from the user's MCF. Preferably, if any account has no recorded update address in the MCF, or if any update fails (e.g. the profile update page has moved or is non-existent), an error report is generated to prompt the user to take manual action. Additionally, a log of successful updates is preferably generated to inform the user of all accounts which were successfully updated.

Automatic Value Expiration Management

Similar to the automatic registered information update functionality previously described, our invention also preferably includes an optional logical process to manage or force the expiration of values, especially, but not limited to, passwords. When a user is creating a new account online, he or she is often informed that the account will force an expiration of the user's password within a certain amount of time, such as 90 days, 6 months, or a year. This usually is an effort by the web site operator to maintain security, because comprised passwords will eventually expire and be replaced with new, uncompromised passwords.

In FIG. 3, an example of a notation in a MCF for an expirable parameter is shown in the password for the XYZ Bank account, wherein the password is set to expire on 08-31-2005. This value may be set by the user when the password is being originally recorded during account set up, or later by the user if the user wants to force an expiration or update.

Figure 11:
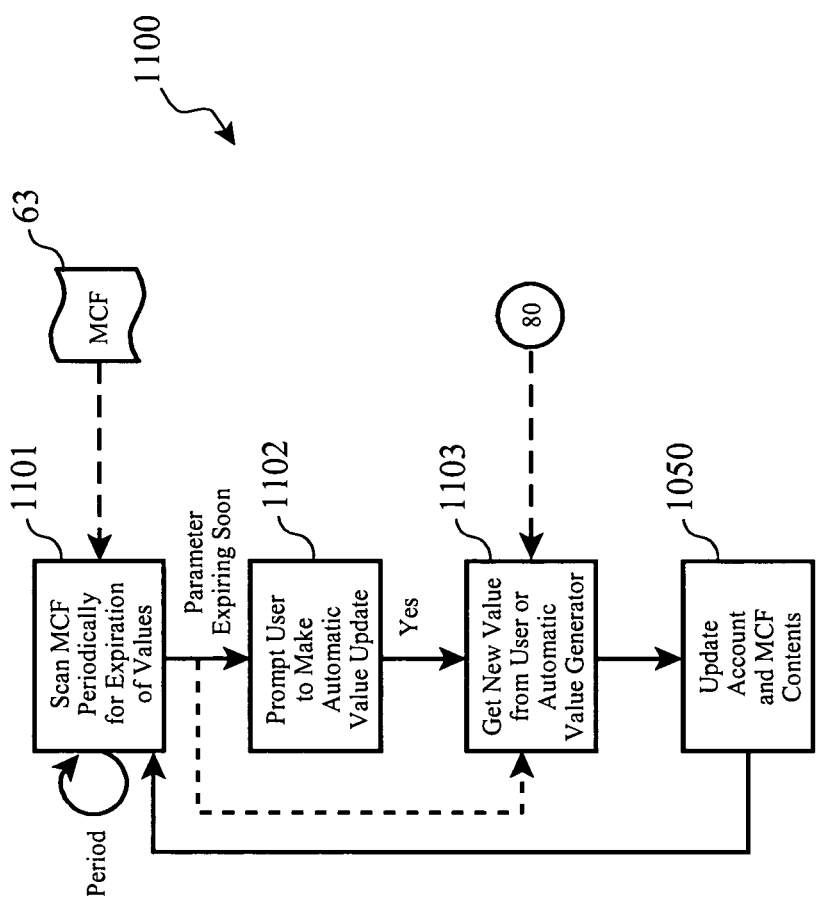
FIG. 11 illustrates a logical process according to the invention for automatically managing and/or forcing expiration of registered values.

Turning to FIG. 11, the invention with this optional embodiment feature (1100) analyzes (1101) the user's MCF (63) periodically, and preferably at least once per day or more often depending on the resolution of the expiration allowed for values in the MCF. For example, in an embodiment where expiration may be specified in terms of minutes, hours, and days, the analysis should be performed on a minute basis, or less.

When a value is detected to be expiring, the invention preferably prompts (1102) the user for permission to automatically update the expiring registered value, which can then be done (1050) as described in the foregoing paragraphs regarding automatic updates of registered information. Additionally, this logical process is preferably combined with the previously described automatic value selection assistant (80) to select a new, available and non-duplicate value, and combined with the previously described mapping function to allow the user to continue to use his or her favorite corresponding value.

Sharing of MCF Fragments

Figure 12:
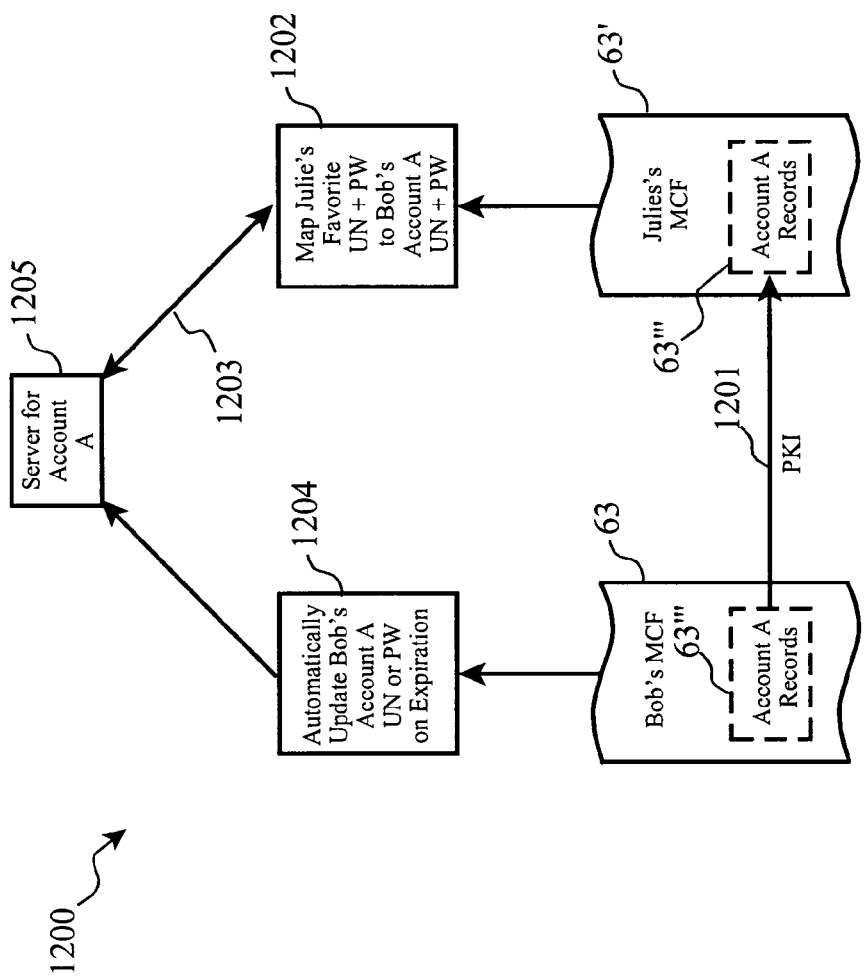
FIG. 12 shows details of a logical process according to the invention for sharing fragments or portions of MCF between users to allow one user to provide account access to another user.

In another aspect of the present invention, fragments or portions of a user's MCF may be shared with another user, which is especially useful when both users are using web browsers equipped with the plug-ins for the base logical processes of the invention. For example, as illustrated in FIG. 12, consider a situation where a project team member, Bob Smith, has established an online account with a particular research or search service, Account A (1205). Now, Bob Smith wishes to allow another team member to use his account, but does not wish to actually share his username and password. As such, Bob can select from a user interface menu the account records (63''') (or internal MCF cookie) from his MCF (63) to share (1201) with the second user, perhaps Julie.

This cookie or set of records (63''') is then preferably encrypted (e.g. using Public Key Infrastructure or other suitable technology) by the plug-in in Bob's web browser, and transmitted (1201) to the plug-in in Julie's web browser, where it is stored in Julie's MCF (63'). There, it allows Julie to log into (1203) Bob's account (1205) through the aforementioned mapping function (1202) (e.g. mapping Julie's favorite username and password to Bob's account-specific username and password).

In a server-based embodiment where the MCF's for users are stored in networked server, the sharing operation may not require encryption as it may simply be a data copy within the memory of the server.

Preferably, the expiration feature of the invention is also employed so that Bob can control how long Julie can use the account access, either through Bob's plug-in automatically changing (1204) the shared password, or through Julie's plug-in ignoring or disabling the mapping after the expiration date or time.

According to another optional aspect of the present invention, the owner of the shared MCF records may specify sharing by website or proprietor name, such as sharing only the owner's FedEx™ shipping account or only the owner's Amazon.com™ account.

Examples of Operation and Use

To further facilitate the understanding of the present invention, the following examples of use and operation are presented and discussed. In our first example, without the current invention, if Amy wants to manage her banking, electricity and credit card accounts online, she must point her web browser to multiple company websites to register herself as an user. Then, Amy repeatedly enters her personal data such as Name, Address, Account Number, Phone, etc. Furthermore, Amy must test against each company's website to make sure her login ID is unique and password is valid. As such, without the current invention, Amy spends extensive time and energy for the registration processes, and Amy also has to remember her ID information either on paper, PDA, file, etc.

With the present invention, however, Amy can first registers herself online with her bank. During her registration process, the invention builds a set of records in Amy's MCF for her bank account, including her registered personal information (e.g. name, address, telephone number, password, etc.). Later, as Amy begins to register online with the electric company for her second account, the present invention checks to verify if Amy is already a member (e.g. does her MCF contain records for the electric company already). If not, Amy can allow the present invention to automatically populate her personal information at the electricity website, which is taken from her MCF records for her bank account. The invention also builds another set of records in Amy's MCF for her electric account, too. Later, as Amy registers her four credit card accounts, the invention facilitates the process similarly, and significantly reduces the time spent so Amy can manage her accounts in a more efficient manner. Furthermore, this invention tracks Amy's login information so Amy does not have to remember her account-specific member IDs and passwords, mapping them to her favorite username and password so that she can log in to any of the accounts easily and conveniently.

In our second example scenario, six months later Amy has moved and her electric company has changed. Without the invention, Amy would have to log into each and every online account she has (e.g. bank, electric company, four credit cards, etc.), and manually change her address and probably her telephone number. However, with the invention, Amy goes online and registers at a new energy company, which is detected by the invention. Using her MCF, the invention can automatically populate her information into the forms to register with the new electric company, and can also log into all of her existing accounts to update her address and telephone number. The process of the present can be run and managed in the background and further automated if registration site offers standard and flexible interfaces such as Web Services, including request to open/close/update account.

CONCLUSION

The present invention has been described in terms of several embodiments, including embodiment enhancement and options. It will be recognized by those skilled in the art that these embodiments, however, do not represent the scope of the invention, and that it is within the skill of those in the art to realize the invention in other forms, with or without the disclosed enhancements, without departing from the spirit and scope of the present invention. Thererfore, the scope of the invention should be determined by the following claims.

What is claimed is:

1. A computer-implemented method for automatically completing fields in online forms, comprising:
    disposing in a computer readable storage memory at least one set of records in a Master File, each record set being associated with a user and a specific web site, and one or more recorded registered values associated with form tags;
    displaying on a computer display to a user a fillable online form from a specific web site and having one or more form tags associated with fillable fields in the form;
    responsive to displaying the online form, extracting by a processor from the Master File any recorded values associated with the specific web site and the form tags in the displayed form from the Master File, or responsive to failing to extract a recorded value associated with the specific web site and with form tags in the displayed form;
    generating by a processor a new form input value by appending or pre-pending a previously recorded user challenge question answer string value to at least one additional previously-recorded value, and providing the user a visual prompt for the generated value, wherein the generated value is a reasonable logical value suitable for memorization by the user;
    providing by a processor to the user on a computer display a visual prompt for the extracted recorded values or the generated value; and
    responsive to user selection of one or more of the values in the visual prompt, automatically entering by a processor the selected values into one or more fields of the displayed form.

2. The method as set forth in claim 1 wherein the disposing records in a Master File comprises disposing one or more cookie files in the Master File.

3. The method as set forth in claim 1 further comprising displaying a flowing pop-up menu adjacent to or with a visual link to a form field for which the associated recorded values in the Master File are found.

4. The method as set forth in claim 3 wherein the flowing pop-up menu is displayed responsive to the user moving or placing a pointing indicator over the form field.

5. The method as set forth in claim 3 wherein the flowing pop-up menu is displayed responsive to the user moving or placing a cursor in the form field.

6. The method as set forth in claim 1 wherein the user challenge question answer comprises a previously registered answer selected from a group comprising a user's pet name, a birthdate value, and a school mascot.

7. A computer readable memory for automatically completing fields in online forms comprising:
    one or more computer readable storage memories suitable for encoding one or more software programs; and
    one or more software programs encoded by the one or more computer readable memories which, when executed by a processor:
        dispose in a computer readable storage memory at least one set of records in a Master File, each record set being associated with a user and a specific web site, and one or more recorded registered values associated with form tags;
        display on a computer display to a user a fillable online form from a specific web site and having one or more form tags associated with fillable fields in the form;
        responsive to displaying the online form, extract from the Master File any recorded values associated with the specific web site and the form tags in the displayed form from the Master File, or responsive to failing to extract a recorded value associated with the specific web site and with form tags in the displayed form;
        generate a new input form value by appending or pre-pending a previously-recorded user challenge question answer string value to at least one other previously-recorded value, and providing the user a visual prompt for the generated value, wherein the generated value is a logical, reasonable value suitable for memorization by the user;
        provide to the user a visual prompt on a computer display for the extracted recorded values or the generated value; and
        responsive to user selection of one or more of the values in the visual prompt, automatically enter the selected values into one or more fields of the displayed form.

8. The computer readable memory as set forth in claim 7 wherein the disposing records in a Master File comprises disposing one or more cookie files in the Master File.

9. The computer readable memory as set forth in claim 7 wherein the software program further performs displaying a flowing pop-up menu adjacent to or with a visual link to a form field for which the associated recorded values in the Master File are found.

10. The computer readable memory as set forth in claim 9 wherein the flowing pop-up menu is displayed responsive to the user moving or placing a pointing indicator over the form field.

11. The computer readable memory as set forth in claim 9 wherein the flowing pop-up menu is displayed responsive to the user moving or placing a cursor in the form field.

12. The computer readable memory as set forth in claim 7 wherein the user challenge question answer comprises a previously registered answer selected from a group comprising a user's pet name, a birthdate value, and a school mascot.

13. A system for automatically completing fields in online forms comprising:
   at least one set of records in a Master File disposed in a computer readable storage memory, each record set being associated with a user and a specific web site, and one or more recorded registered values associated with form tags;
   a computer display displaying to a user a fillable online form from a specific web site and having one or more form tags associated with fillable fields in the form;
   an extractor portion of a computing platform, responsive to displaying the online form, extracting from the Master File any recorded values associated with the specific web site and the form tags in the displayed form from the Master File, or responsive to failing to extract a recorded value associated with the specific web site and with form tags in the displayed form;
   a value generator portion of a computing platform generating a new form input value by appending or pre-pending a previously-recorded user challenge question answer string value to at least one other previously-recorded value, and providing the user a visual prompt for the generated value, wherein the generated value is a logical, reasonable value suitable for memorization by a user;
   a visual prompt on the computer display prompting the user for the extracted recorded values or the generated value; and
   an automatic field filler portion of a computing platform, responsive to user selection of one or more of the values in the visual prompt, automatically entering the selected values into one or more fields of the displayed form.

14. The system as set forth in claim 13 wherein the Master File comprises one or more cookie files.

15. The system as set forth in claim 13 further comprising a flowing pop-up menu displayed adjacent to or with a visual link to a form field for which the associated recorded values in the Master File are found.

16. The system as set forth in claim 15 wherein the flowing pop-up menu is displayed responsive to the user moving or placing a pointing indicator over the form field.

17. The system as set forth in claim 15 wherein the flowing pop-up menu is displayed responsive to the user moving or placing a cursor in the form field.

18. The system as set forth in claim 13 wherein the user challenge question answer comprises a previously registered answer selected from a group comprising a user's pet name, a birthdate value, and a school mascot.

\* \* \* \* \*